(12) United States Patent
Luo et al.

(10) Patent No.: US 11,374,246 B2
(45) Date of Patent: Jun. 28, 2022

(54) AMMONIA FUEL CELL SYSTEM AND ELECTRIC DEVICE

(71) Applicants: Fuzhou University, Quanzhou (CN); Beijing Sanju Environmental Protection & New Materials Co., Ltd., Beijing (CN)

(72) Inventors: Yu Luo, Quanzhou (CN); Lilong Jiang, Quanzhou (CN); Chongqi Chen, Quanzhou (CN)

(73) Assignees: FUZHOU UNIVERSITY, Quanzhou (CN); BEIJING SANJU ENVIRONMENTAL PROTECTION & NEW MATERIALS CO., LTD., Beijing (CN)

( * ) Notice: Subject to any disclaimer, the term of this patent is extended or adjusted under 35 U.S.C. 154(b) by 200 days.

(21) Appl. No.: 16/749,854

(22) Filed: Jan. 22, 2020

(65) Prior Publication Data

US 2020/0403258 A1    Dec. 24, 2020

(30) Foreign Application Priority Data

Jun. 20, 2019 (CN) .......................... 201910537684.1

(51) Int. Cl.
*H01M 8/0606* (2016.01)
*B60L 50/51* (2019.01)
(Continued)

(52) U.S. Cl.
CPC .......... *H01M 8/0606* (2013.01); *B60L 50/51* (2019.02); *B60L 50/75* (2019.02); *C01B 3/047* (2013.01); *H01M 8/04022* (2013.01); *H01M 8/04738* (2013.01); *H01M 10/0525* (2013.01); *H01M 10/345* (2013.01); *H01M 16/006* (2013.01);
(Continued)

(58) Field of Classification Search
CPC .... B60L 1/02; B60L 2210/10; B60L 2210/40; B60L 50/51; B60L 50/75; B60L 58/40; C01B 2203/066; C01B 2203/0811; C01B 3/047; H01M 10/0525; H01M 10/345; H01M 2220/20; H01M 2250/20; H01M 8/04022; H01M 8/04738; H01M 8/0606; H01M 8/0662; Y02E 60/10; Y02E 60/36;
(Continued)

(56) References Cited

U.S. PATENT DOCUMENTS

2014/0356738 A1* 12/2014 Bell .................... H01M 8/0662
429/411

* cited by examiner

*Primary Examiner* — Victoria H Lynch
(74) *Attorney, Agent, or Firm* — Seyfarth Shaw LLP

(57) ABSTRACT

An ammonia fuel cell system and an electric device are described. The ammonia fuel cell system includes an ammonia decomposition reaction device, a heating device, a hydrogen fuel cell, a DC/DC converter and an inverter connected successively, a battery pack and a heat exchanger. The heat exchanger of the system, can preheat ammonia gas by energy generated by ammonia decomposition, thereby recycling heat waste. The battery pack supports a quick response and stable output to quickly cope with the acceleration and deceleration of the electric device. This improves the stability of the system operation, and electric energy generated by the hydrogen fuel cell or electric energy in the battery pack can be transferred to the outside. The battery pack or the heating device can provide energy to the ammonia decomposition reaction device, so there is no need to supply outside energy to the ammonia decomposition reaction device.

15 Claims, 3 Drawing Sheets

(51) Int. Cl.
  *B60L 50/75*      (2019.01)
  *C01B 3/04*       (2006.01)
  *H01M 8/04014*    (2016.01)
  *H01M 8/04701*    (2016.01)
  *H01M 10/0525*    (2010.01)
  *H01M 10/34*      (2006.01)
  *H01M 16/00*      (2006.01)

(52) U.S. Cl.
  CPC ....... *B60L 2210/10* (2013.01); *B60L 2210/40* (2013.01); *H01M 2220/20* (2013.01); *H01M 2250/20* (2013.01)

(58) Field of Classification Search
  CPC ........ Y02E 60/50; Y02P 20/129; Y02T 10/70; Y02T 90/40
  See application file for complete search history.

AMMONIA FUEL CELL SYSTEM AND ELECTRIC DEVICE

CROSS-REFERENCE TO RELATED APPLICATION

The present application claims the benefit of Chinese Patent Application No. 201910537684.1, filed Jun. 20, 2019, and titled "AMMONIA FUEL CELL SYSTEM AND ELECTRIC DEVICE," the disclosure of which is expressly incorporated by reference herein in its entirety.

FIELD

The present disclosure relates to the field of ammonia decomposition technology, and particularly relates to an ammonia fuel cell system and an electric device.

BACKGROUND

A fuel cell, as a chemical device that directly converts chemical energy of a fuel into electric energy, is also called an electrochemical generator. It is the fourth type of power generation technology after hydroelectric power, thermal power and atomic power generation. Since the fuel cell converts the Gibbs' free energy portion of the chemical energy of the fuel into an electric energy by an electrochemical reaction, it is not limited by the Carnot cycle effect, and the efficiency is high. In addition, the fuel cell and oxygen are used as raw materials, and no mechanical transmission component is available, so noise pollution is avoided, and less harmful gases are emitted. Therefore, it can be seen that, from the perspectives of energy conservation and ecological environmental protection, fuel cells have a good prospect for development.

In a fuel cell, an electrochemical reaction occurs mainly between oxygen or other oxidant and a fuel. The fuel cell is a battery that converts chemical energy in the fuel into electrical energy. In the fuel cell, the fuel and air are respectively fed into an anode and a cathode of the fuel cell, and electricity can be produced in this way. Hydrogen fuel is currently the most ideal fuel in fuel cell applications. Hydrogen fuel has high efficiency, and generates water as a fuel product without ash and waste gas, thus having no pollution to the environment, and it can be recycled and is widely available. Therefore, hydrogen fuel is considered to be the most ideal energy source in the 21st century. However, the hydrogen storage technology still has many challenges. The volumetric energy density of hydrogen at normal temperature and pressure is 0.0108 $MJ \cdot L^{-1}$. To meet the mileage demand of fuel cells for vehicles, hydrogen needs to be pressurized to 35 MPa, so that the volumetric energy density of hydrogen can be increased to 3 $MJ \cdot L^{-1}$. This increases the corresponding investment cost and reduces the safety of fuel cells for vehicles. As an alternative fuel for hydrogen, ammonia can have a hydrogen content of up to 17.6 wt %. Ammonia has the advantages of easy liquefaction, a high energy density, no carbon emission, high safety, a low fuel cost, etc. At a pressure of only 2 MPa, ammonia can be liquefied into liquid with a volumetric energy density of up to 13 $MJ \cdot L^{-1}$, which is 3-4 times that of compressed hydrogen storage. Thus, ammonia is one of the ideal fuels for fuel cells for vehicles in the future. However, when ammonia is used in a fuel cell for a vehicle, protons in a perfluorosulfonic acid membrane in a proton exchange membrane fuel cell react with high-concentration ammonia to form $NH_4^+$ ions, which easily leads to irreversible attenuation of the performance of the proton exchange membrane fuel cell (PEMFC). Therefore, an ammonia fuel cell system requires coupling of a series of component devices such as those for ammonia decomposition, ammonia removal, and a hydrogen fuel cell. The efficient integration of these component devices involves complex energy management and system control strategies, which is liable to cause unstable operation and high energy consumption of the ammonia fuel cell system.

SUMMARY

Therefore, a technical problem to be solved by the present disclosure is to overcome shortcomings of poor variable condition performance, high energy consumption and slow startup of the ammonia fuel cell system in the prior art, thereby providing an ammonia fuel cell system.

To this end, the present disclosure provides the following technical solutions. The present disclosure provides an ammonia fuel cell system, including: an ammonia decomposition reaction device and a heating device for controlling an internal temperature of the ammonia decomposition reaction device; a hydrogen fuel cell in communication with the ammonia decomposition reaction device which supplies hydrogen gas to the hydrogen fuel cell; a conversion device including a DC/DC converter and an inverter connected successively, the DC/DC converter being connected to the hydrogen fuel cell to boost a voltage of the hydrogen fuel cell; a battery pack bidirectionally communicated with the inverter to store electrical energy generated by the hydrogen fuel cell or to transfer electrical energy in the battery pack to the outside, the battery pack and the heating device providing energy to the ammonia decomposition reaction device; and a heat exchanger disposed between the ammonia decomposition reaction device and the hydrogen fuel cell, wherein one end of the heat exchanger is externally connected to an ammonia supply device, and another end of the heat exchanger is communicated with an ammonia gas inlet of the ammonia decomposition reaction device, so that the heat exchanger is capable of preheating ammonia by using energy generated after ammonia decomposition, and the preheated ammonia gas enters the interior of the ammonia decomposition reaction device.

The ammonia fuel cell system further includes an ammonia removal device disposed between the heat exchanger and the hydrogen fuel cell to remove undecomposed ammonia; ammonia removal methods include an adsorption method, a complexing method and a selective catalytic oxidation method; in the adsorption method, the ammonia removal device is filled with an adsorbent such as a zeolite molecular sieve or an activated carbon to adsorb ammonia gas; in the complexing method, $MgCl_2$, $CuCl_2$ or the like is used for a complex reaction with ammonia gas to remove the ammonia gas; and in the selective catalytic oxidation method, ammonia gas is oxidized by using a transition metal oxide such as $V_2O_5$, $Cr_2O_3$, $MoO_x$ or $WO_x$ as a catalyst to remove the ammonia gas.

The ammonia fuel cell further includes an air pipeline including a first air pipeline and a second air pipeline, wherein the first air pipeline is in communication with the hydrogen fuel cell, and the second air pipeline is in communication with the heating device, the ammonia supply device and an anode gas outlet of the hydrogen fuel cell are both communicated with the second air pipeline, so as to introduce a portion of air, an outlet gas from the anode gas outlet, and a portion of ammonia gas into the interior of the heating device after heat exchange through the heat exchanger to provide energy to the ammonia decomposition reaction device; and the heating device is a porous burner or a catalytic burner.

Further, a space velocity ratio of the outlet gas from the anode gas outlet to the portion of ammonia gas is (6-20):1; and space velocity ratio of the outlet gas from the anode gas outlet to the portion of air is 1:(2-4).

Further, the heating device is an electric heater; the battery pack is connected to the electric heater to supply energy to the heating device; the hydrogen fuel cell is a proton exchange membrane fuel cell; and the battery pack is a Ni-MH battery pack or a lithium ion battery pack.

The proton exchange membrane fuel cell is a low-temperature perfluoro-acid PEMFC battery or a high-temperature PBI (polybenzimidazole) PEMFC battery; the proton exchange membrane fuel cell has an operating temperature of 50-90° C. when the proton exchange membrane fuel cell is a low-temperature perfluoric-acid PEMFC battery; and the proton exchange membrane fuel cell has an operating temperature of 150 to 190° C. when the proton exchange membrane fuel cell is a high-temperature PBI (polybenzimidazole) PEMFC battery.

The ammonia decomposition reaction device is filled with a ruthenium-based catalyst, and the ammonia decomposition reaction device has an operating temperature of 400-650° C. and a space velocity of 500-10000 mL/($g_{cat}$·h).

The present disclosure further provides an electric device including the above-mentioned ammonia fuel cell system.

The electric device further includes a driving device including a motor controller and a drive motor connected successively, the motor controller being bidirectionally connected with the inverter, to control the drive motor by the motor controller.

The electric device is an electric vehicle. The technical solutions of the present disclosure have the following advantages. The ammonia fuel cell system provided in the present disclosure includes an ammonia decomposition reaction device, a heating device, a hydrogen fuel cell, a DC/DC converter and an inverter connected successively, a battery pack and a heat exchanger. In the system, the heat exchanger is disposed between the ammonia decomposition reaction device and the hydrogen fuel cell, one end of the heat exchanger being externally connected to an ammonia supply device, and the other end of the heat exchanger being communicated with an ammonia gas inlet of the ammonia decomposition reaction device, so that ammonia is preheated by using energy generated after ammonia decomposition, thereby achieving recycling of waste heat. In the system, the battery pack is communicated with the inverter, so that the battery pack can have a quick response and stable output to quickly cope with the acceleration and deceleration of the electric device, thereby improving the dynamic performance and operating stability of the system, and the battery pack can transfer electric energy generated by the hydrogen fuel cell or electric energy in the battery pack to the outside, thereby achieving optimal utilization of the electric energy and improving the utilization efficiency of the system. In the system, the ammonia decomposition reaction device is communicated with the hydrogen fuel cell to supply hydrogen gas to the hydrogen fuel cell, and the DC/DC converter is connected with the hydrogen fuel cell to boost a voltage of the hydrogen fuel cell, so that the electric energy generated by the hydrogen fuel cell can be transferred to the outside, and the battery pack or the heating device can provide energy to the ammonia decomposition reaction device, so there is no need to supply energy to the ammonia decomposition reaction device from the outside.

The ammonia fuel cell system can operate stably for a long period of time and achieve cyclic utilization, and has the advantages of high flexibility, low energy consumption and high system utilization rate.

In the case of the ammonia fuel cell system provided in the present disclosure, the system is provided with an ammonia removal device, so that poisoning of the PEMFC can be effectively avoided, or a high-temperature PBI PEMFC is used, so that the tolerance of the fuel cell to ammonia poisoning can be improved, thus improving the tolerance of the ammonia fuel cell system to ammonia poisoning. In the system, the heating device is a porous burner or a catalytic burner, so that the exhaust gas of the hydrogen fuel cell can be reutilized, and the fuel utilization rate can be increased. In the system, when the battery back is communicated with the heating device, the ammonia decomposition reaction device can reach the reaction temperature within 5 min, and after the reaction temperature is reached, only one-fifth of the electric energy at startup of the battery pack is needed to maintain the ammonia decomposition reaction, thus achieving quick startup, low energy consumption and high efficiency.

The electric device provided in the present disclosure includes a driving device including a motor controller and a drive motor connected successively, the motor controller being bidirectionally connected with the inverter, to control the drive motor by the motor controller, so that the driving device can control the acceleration and deceleration of the electric device, and when the electric devices decelerates, electric energy from deceleration can be recovered, so the electric energy utilizing efficiency is high.

BRIEF DESCRIPTION OF THE DRAWINGS

To more clearly describe technical solutions in the embodiments of the present disclosure or in the prior art, a brief introduction to the drawings for use in description of the embodiments or the prior art will be given below. Apparently, the drawings described below illustrate some embodiments of the present disclosure, and to those of ordinary skill in the art, other drawings may also be obtained based on these drawings without any creative effort.

Figure 1:
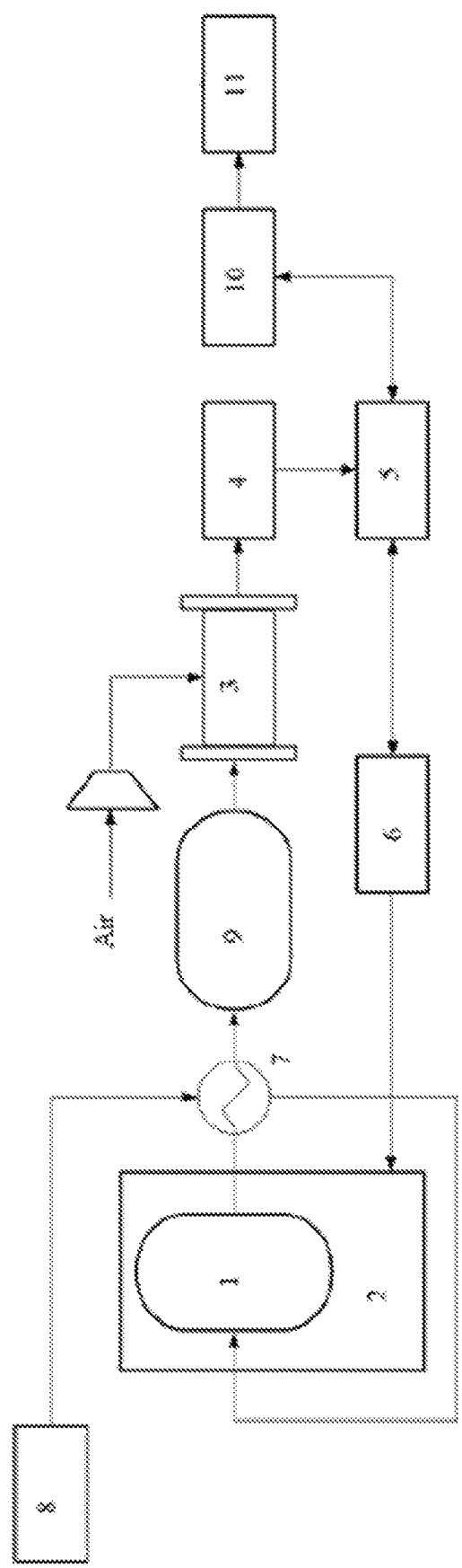
FIG. 1 is a structural schematic diagram of an ammonia fuel cell system in embodiment 1 of the present disclosure.

Reference numerals: 1—ammonia decomposition reaction device; 2—heating device; 3—hydrogen fuel cell; 4—DC/DC converter; 5—inverter; 6—battery pack; 7—heat exchanger; 8—ammonia storage tank; 9—ammonia removal device; 10—motor controller; 11—drive motor.

DETAILED DESCRIPTION OF THE EMBODIMENTS

The following embodiments are provided to further understand the present disclosure, are not limited to the preferred embodiments, and do not limit the contents and the protection scope of the present disclosure. All products that are identical or similar to the present disclosure obtained by any person under enlightenment of the present disclosure or by combing features of the present disclosure and other prior art fall within the protection scope of the present disclosure.

If specific experimental steps or conditions are not indicated in embodiments, such embodiments can be implemented according to operations or conditions of the conventional experimental steps described in the literature in the art. Reagents or instruments adopted, whose manufacturers are not indicated, are conventional reagent products which are commercially available.

Embodiment 1

The present embodiment provides an ammonia fuel cell system, as shown in FIG. 1, including: an ammonia decomposition reaction device 1 and a heating device 2 for controlling an internal temperature of the ammonia decomposition reaction device, wherein specifically, in the present embodiment, the heating device is an electric heater, and the ammonia decomposition reaction device is filled with a ruthenium-based catalyst, and has an operating temperature of 500° C.; a hydrogen fuel cell 3 in communication with the ammonia decomposition reaction device which supplies hydrogen gas to the hydrogen fuel cell, and also in communication with an air pipeline, wherein specifically, in the present embodiment, the hydrogen fuel cell is a low-temperature perfluoro-acid PEMFC (proton exchange membrane fuel cell), an operating temperature of PEMFC is 80° C., with an anode flow channel communicated with the air pipeline and a cathode flow channel communicated with the air pipeline; a conversion device including a DC/DC converter 4 and an inverter 5 connected successively, the DC/DC converter being connected to the hydrogen fuel cell to boost a voltage of the hydrogen fuel cell; a battery pack 6 bidirectionally communicated with the inverter to store electrical energy generated by the hydrogen fuel cell or to transfer electrical energy in the battery pack to the outside, the battery pack being connected to the electric heater to supply energy to the ammonia decomposition reaction device, wherein specifically, in the present embodiment, the battery pack is a Ni-MH battery; a heat exchanger 7 disposed between the ammonia decomposition reaction device and the hydrogen fuel cell, wherein one end of the heat exchanger is externally connected to an ammonia supply device, and the other end of the heat exchanger is communicated with an ammonia gas inlet of the ammonia decomposition reaction device, so that the heat exchanger is capable of preheating ammonia by using energy generated after ammonia decomposition, and the preheated ammonia gas enters the interior of the ammonia decomposition reaction device; specifically, in the present embodiment, the ammonia supply device is an ammonia storage tank 8; and an ammonia removal device 9 disposed between the heat exchanger and the hydrogen fuel cell to remove undecomposed ammonia, wherein specifically, in the present embodiment, the ammonia removal is carried out by using an adsorption method, and a zeolite molecular sieve is filled in the ammonia removal device, for adsorbing ammonia gas in a nitrogen-hydrogen mixture, so that the ammonia gas content in the nitrogen-hydrogen mixture is less than 0.1 ppm.

The present embodiment further provides an electric device including the above-mentioned ammonia fuel cell system. Specifically, in the present embodiment, the electric device is an electric vehicle, which further includes: a driving device, including a motor controller 10 and a drive motor 11 connected successively, the motor controller being bidirectionally connected with the inverter, to control the drive motor by the motor controller.

After the Ni-MH battery is enabled, it starts to supply power to the electric heater. The electric heater heats the ammonia decomposition reaction device. The ammonia decomposition reaction device reaches 500° C. within 5 min. When the ammonia decomposition reaction device reaches a set temperature, the Ni-MH battery maintain one-fifth of the power at startup to ensure that the temperature of the ammonia decomposition reaction device is stable, and the ammonia decomposition reaction is carried out normally. After the ammonia decomposition reaction device reaches 500° C., the reaction starts to produce a nitrogen-hydrogen mixture to provide a fuel to the PEMFC, and the PEMFC starts to work. The PEMFC charges the Ni-MH battery until an SOC is higher than 90%. The system can be so configured that the power of the PEMFC is 120 kW, the power of the battery pack is 60 kWh, and the rated power of the drive motor is 120 kW.

Embodiment 2

Figure 2:
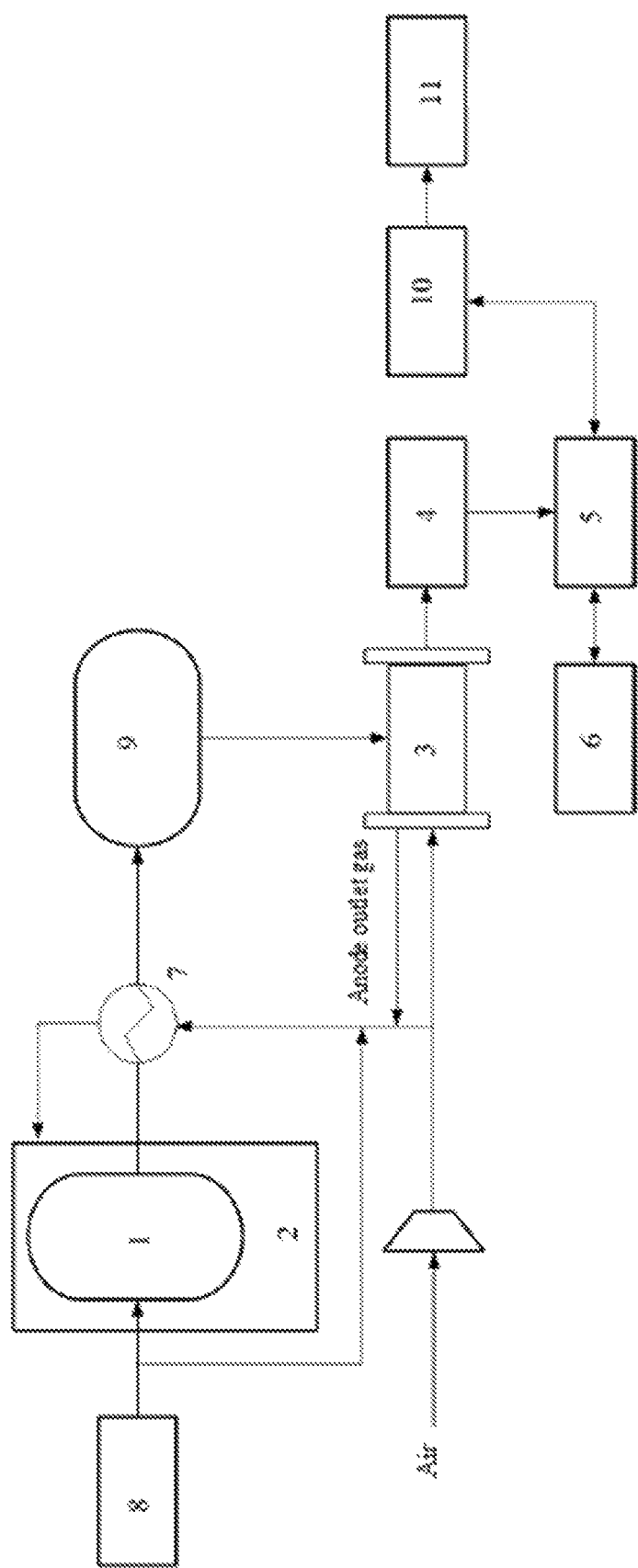
FIG. 2 is a structural schematic diagram of an ammonia fuel cell system in embodiment 2 of the present disclosure.

The present embodiment provides an ammonia fuel cell system, as shown in FIG. 2, including: an ammonia decomposition reaction device 1 and a heating device 2 for controlling an internal temperature of the ammonia decomposition reaction device, wherein specifically, in the present embodiment, the heating device is a fuel heater, and the ammonia decomposition reaction device is filled with a ruthenium-based catalyst, and has an operating temperature of 500° C.; a hydrogen fuel cell 3 in communication with the ammonia decomposition reaction device which supplies hydrogen gas to the hydrogen fuel cell, wherein specifically, in the present embodiment, the hydrogen fuel cell is a low-temperature perfluoro-acid PEMFC (proton exchange membrane fuel cell), an operating temperature of which is 80° C.; a conversion device including a DC/DC converter 4 and an inverter 5 connected successively, the DC/DC converter being connected to the hydrogen fuel cell to boost a voltage of the hydrogen fuel cell; a battery pack 6 bidirectionally communicated with the inverter to store electrical energy generated by the hydrogen fuel cell or to transfer electrical energy in the battery pack to the outside, wherein specifically, in the present embodiment, the battery pack is a lithium ion battery; a heat exchanger 7 disposed between the ammonia decomposition reaction device and the hydrogen fuel cell, wherein one end of the heat exchanger is externally connected to an ammonia supply device, and the other end of the heat exchanger is communicated with an ammonia gas inlet of the ammonia decomposition reaction device, so that the heat exchanger is capable of preheating ammonia by using energy generated after ammonia decomposition, and the preheated ammonia gas enters the interior of the ammonia decomposition reaction device; specifically, in the present embodiment, the ammonia supply device is an ammonia storage tank 8; an ammonia removal device 9 disposed between the heat exchanger and the hydrogen fuel cell to remove undecomposed ammonia, wherein specifically, in the present embodiment, the ammonia removal may be carried out by using a selective catalytic oxidation method, in which $Cr_2O_3$ is used as a catalyst, and mixed with 1% of air, ammonia gas is oxidized at 300° C., so that the ammonia concentration can be less than 1 ppm; and alternatively, in the present embodiment, the ammonia removal may also be carried out by using a complexing method, in which the ammonia removal device is filled with $MgCl_2$, and when the ammonia gas passes through the ammonia removal device, a complex reaction with $MgCl_2$ occurs, so that the ammonia gas content in a nitrogen-hydrogen mixture can be lower than 0.3 ppm; and an air pipeline including a first air pipeline and a second air pipeline, wherein the first air pipeline is in communication with the hydrogen fuel cell, and the second air pipeline is in communication with the heating device, the ammonia supply device and an anode gas outlet of the hydrogen fuel cell are both communicated with the second air pipeline, so as to introduce a portion of air, an outlet gas from the anode gas outlet, and a portion of ammonia gas into the interior of the heating device after heat exchange through the heat exchanger to provide energy to the ammonia decomposition reaction device; specifically, in the present embodiment, a space velocity ratio of the part of air to the outlet gas from the anode gas outlet to the portion of ammonia gas is 3:10:1; and wherein the heating device is a porous burner.

The present embodiment further provides an electric vehicle including the above-mentioned ammonia fuel cell system, further including a driving device which includes a motor controller 10 and a drive motor 11 connected successively, the motor controller being bidirectionally connected with the inverter, to control the drive motor by the motor controller.

The air, the exhaust gas discharged from the anode gas outlet of the air and the ammonia gas are mixed and burned in the combustion heater, and heat released by the combustion can ensure that the temperature of the ammonia decomposition reaction device is stable, and the ammonia decomposition reaction is carried out normally. After the ammonia decomposition reaction device reaches 500° C., the reaction starts to produce a nitrogen-hydrogen mixture to provide a fuel to the PEMFC, and the PEMFC starts to work. The PEMFC charges the lithium-ion battery until an SOC is higher than 90%. The system can be so configured that the power of the PEMFC is 120 kW, the power of the burner is 20 kW, the power of the battery pack is 50 kWh, and the rated power of the drive motor is 120 kW.

Embodiment 3

Figure 3:
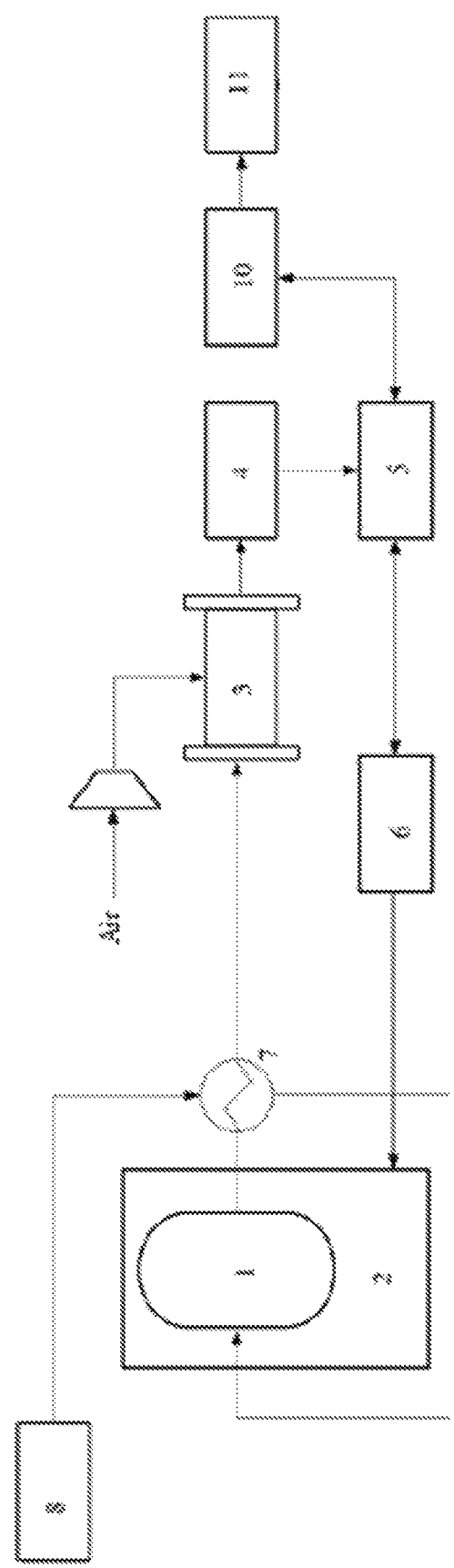
FIG. 3 is a structural schematic diagram of an ammonia fuel cell system in embodiment 3 of the present disclosure.

The present embodiment provides an ammonia fuel cell system, as shown in FIG. 3, including: an ammonia decomposition reaction device 1 and a heating device 2 for controlling an internal temperature of the ammonia decomposition reaction device, wherein specifically, in the present embodiment, the heating device is an electric heater, and the ammonia decomposition reaction device is filled with a ruthenium-based catalyst, and has an operating temperature of 500° C.; a hydrogen fuel cell 3 in communication with the ammonia decomposition reaction device which supplies hydrogen gas to the hydrogen fuel cell, and also in communication with an air pipeline, wherein specifically, in the present embodiment, the hydrogen fuel cell is a high-temperature PBI-PEMFC, an operating temperature of the high-temperature PBI-PEMFC is 180° C.; a conversion device including a DC/DC converter 4 and an inverter 5 connected successively, the DC/DC converter being connected to the hydrogen fuel cell to boost a voltage of the hydrogen fuel cell; a battery pack 6 bidirectionally communicated with the inverter to store electrical energy generated by the hydrogen fuel cell or to transfer electrical energy in the battery pack to the outside, the battery pack being connected to the electric heater to supply energy to the ammonia decomposition reaction device, wherein specifically, in the present embodiment, the battery pack is a Ni-MH battery; and a heat exchanger 7 disposed between the ammonia decomposition reaction device and the hydrogen fuel cell, wherein one end of the heat exchanger is externally connected to an ammonia supply device, and the other end of the heat exchanger is communicated with an ammonia gas inlet of the ammonia decomposition reaction device, so that the heat exchanger is capable of preheating ammonia by using energy generated after ammonia decomposition, and the preheated ammonia gas enters the interior of the ammonia decomposition reaction device; specifically, in the present embodiment, the ammonia supply device is an ammonia storage tank 8.

The present embodiment further provides an electric device including the above-mentioned ammonia fuel cell system, specifically further including: a driving device, including a motor controller 10 and a drive motor 11 connected successively, the motor controller having s bidirectional connection with the inverter, to control the drive motor by the motor controller.

After the Ni-MH battery is enabled, it starts to supply power to the electric heater. The electric heater heats the ammonia decomposition reaction device. The ammonia decomposition reaction device reaches 500° C. within 5 min. When the ammonia decomposition reaction device reaches a set temperature, the Ni-MH battery maintains one-fifth of the power at startup to ensure that the temperature of the ammonia decomposition reaction device is stable, and the ammonia decomposition reaction is carried out normally. After the ammonia decomposition reaction device reaches 500° C., the reaction starts to produce a nitrogen-hydrogen mixture to provide a fuel to the PEMFC, and the PEMFC starts to work. The PEMFC charges the Ni-MH battery until an SOC is higher than 90%. The system can be so configured that the power of the PEMFC is 120 kW, the power of the battery pack is 60 kWh, and the rated power of the drive motor is 120 kW.

Obviously, the embodiments described above are merely examples for clear description, and are not intended to limit the implementations. Other variations or modifications of the various forms may be made by those skilled in the art based on the above description. There is no need and no way to exhaust all of the implementations herein. Obvious variations or modifications derived therefrom are still within the protection scope of the invention-creation.

What is claimed is:

1. An ammonia fuel cell system, comprising:
an ammonia decomposition reaction device and a heating device for controlling an internal temperature of the ammonia decomposition reaction device;
a hydrogen fuel cell in communication with the ammonia decomposition reaction device which supplies hydrogen gas to the hydrogen fuel cell;
a conversion device comprising a DC/DC converter and an inverter connected successively, the DC/DC converter being connected to the hydrogen fuel cell to boost a voltage of the hydrogen fuel cell;
a battery pack bidirectionally communicated with the inverter to store electrical energy generated by the hydrogen fuel cell or to transfer electrical energy in the battery pack to the outside, the battery pack and the heating device providing energy to the ammonia decomposition reaction device; and
a heat exchanger disposed between the ammonia decomposition reaction device and the hydrogen fuel cell, wherein one end of the heat exchanger is externally connected to an ammonia supply device, and another end of the heat exchanger is communicated with an ammonia gas inlet of the ammonia decomposition reaction device, so that the heat exchanger is capable of preheating ammonia by using energy generated after ammonia decomposition, and a preheated ammonia gas enters the interior of the ammonia decomposition reaction device.

2. The ammonia fuel cell system according to claim 1, further comprising:
an ammonia removal device disposed between the heat exchanger and the hydrogen fuel cell to remove undecomposed ammonia.

3. The ammonia fuel cell system according to claim 2, further comprising:
an air pipeline comprising a first air pipeline and a second air pipeline, wherein the first air pipeline is in communication with the hydrogen fuel cell, and
wherein the second air pipeline is in communication with the heating device, the ammonia supply device and an anode gas outlet of the hydrogen fuel cell, and
wherein the air pipeline is capable of introducing a portion of air, an outlet gas from the anode gas outlet, and a portion of ammonia gas into the interior of the heating device after heat exchange through the heat exchanger to provide energy to the ammonia decomposition reaction device; and
wherein the heating device is a porous burner or a catalytic burner.

4. The ammonia fuel cell system according to claim 3, wherein a space velocity ratio of the outlet gas from the anode gas outlet to the portion of ammonia gas is (6-20): 1; and a space velocity ratio of the outlet gas from the anode gas outlet to the portion of air is 1:(2-4).

5. The ammonia fuel cell system according to claim 3, wherein the ammonia decomposition reaction device is filled with a ruthenium-based catalyst, and the ammonia decomposition reaction device has an operating temperature of 400-650° C. and a space velocity of 500-10000 mL/($g_{cat}$*h).

6. The ammonia fuel cell system according to claim 2, wherein the heating device is an electric heater; the battery pack is connected to the electric heater to supply energy to the heating device;
the hydrogen fuel cell is a proton exchange membrane fuel cell; and
the battery pack is a Ni-MH battery pack or a lithium ion battery pack.

7. The ammonia fuel cell system according to claim 6, wherein the proton exchange membrane fuel cell is a low-temperature perfluoro-acid PEMFC battery or a high-temperature PBI (polybenzimidazole) PEMFC battery;
the proton exchange membrane fuel cell has an operating temperature of 50-90° C. when the proton exchange membrane fuel cell is a low-temperature perfluoric-acid PEMFC battery; and
the proton exchange membrane fuel cell has an operating temperature of 150 to 190° C. when the proton exchange membrane fuel cell is a high-temperature PBI (polybenzimidazole) PEMFC battery.

8. An electric device, comprising the ammonia fuel cell system according to claim 2.

9. The electric device according to claim 8, further comprising a driving device, which comprises a motor controller and a drive motor connected successively, the motor controller being bidirectionally connected with the inverter, to control the drive motor by the motor controller.

10. The electric device according to claim 9, wherein the electric device is an electric vehicle.

11. The ammonia fuel cell system according to claim 1, wherein the heating device is an electric heater; the battery pack is connected to the electric heater to supply energy to the heating device;
the hydrogen fuel cell is a proton exchange membrane fuel cell; and
the battery pack is a Ni-MH battery pack or a lithium ion battery pack.

12. The ammonia fuel cell system according to claim 11, wherein the proton exchange membrane fuel cell is a low-temperature perfluoro-acid PEMFC battery or a high-temperature PBI (polybenzimidazole) PEMFC battery;
the proton exchange membrane fuel cell has an operating temperature of 50-90° C. when the proton exchange membrane fuel cell is a low-temperature perfluoric-acid PEMFC battery; and
the proton exchange membrane fuel cell has an operating temperature of 150 to 190° C. when the proton exchange membrane fuel cell is a high-temperature PBI (polybenzimidazole) PEMFC battery.

13. An electric device, comprising the ammonia fuel cell system according to claim 1.

14. The electric device according to claim 13, further comprising a driving device, which comprises a motor controller and a drive motor connected successively, the motor controller being bidirectionally connected with the inverter, to control the drive motor by the motor controller.

15. The electric device according to claim 13, wherein the electric device is an electric vehicle.

* * * * *